United States Patent
Velummylum et al.

(10) Patent No.: US 9,952,834 B2
(45) Date of Patent: *Apr. 24, 2018

(54) DISTRIBUTION OF APPLICATIONS WITH A SAVED STATE

(71) Applicant: Amazon Technologies, Inc., Seattle, WA (US)

(72) Inventors: Piragash Velummylum, Seattle, WA (US); Matthew Warren Amacker, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/054,848

(22) Filed: Feb. 26, 2016

(65) Prior Publication Data

US 2016/0179475 A1    Jun. 23, 2016

Related U.S. Application Data

(63) Continuation of application No. 13/332,574, filed on Dec. 21, 2011, now Pat. No. 9,274,780.

(51) Int. Cl.
*G06F 9/445* (2006.01)
*G06F 9/44* (2006.01)

(52) U.S. Cl.
CPC ............... *G06F 8/30* (2013.01); *G06F 8/61* (2013.01); *G06F 8/65* (2013.01); *G06F 9/44505* (2013.01)

(58) Field of Classification Search
CPC ....... G06F 8/30; G06F 8/61; G06F 8/65; G06F 9/44505
See application file for complete search history.

(56) References Cited

U.S. PATENT DOCUMENTS

| | | | |
|---|---|---|---|
| 8,171,137 B1 | 5/2012 | Parks et al. | |
| 8,381,205 B2 | 2/2013 | Burke | |
| 9,274,780 B1 * | 3/2016 | Velummylum | G06F 8/65 |
| 2002/0051541 A1 | 5/2002 | Glick et al. | |
| 2008/0134211 A1 * | 6/2008 | Cui | G06F 9/52 719/318 |
| 2009/0077173 A1 | 3/2009 | Lowery et al. | |
| 2009/0150486 A1 | 6/2009 | Franco et al. | |
| 2011/0040826 A1 * | 2/2011 | Chadzelek | H04L 67/142 709/203 |
| 2011/0080919 A1 | 4/2011 | Ding et al. | |

(Continued)

*Primary Examiner* — Marina Lee
(74) *Attorney, Agent, or Firm* — Thomas | Horstemeyer, LLP

(57) ABSTRACT

Disclosed are various embodiments for sharing applications initialized to a specified state. In one embodiment, a saved state service receives a plurality of state parameters that describe a state of the application, wherein the state parameters are reported by the application during execution of the application. The save state service then generates a unique data string that corresponds to the state parameters by serializing the state parameters using a data interchange standard. The saved state service may then generate a link to install the application, wherein the link includes the unique data string. In one embodiment, the saved state service serves up the link that, upon invocation on a client, installs the application and initializes the application in the specified state.

20 Claims, 4 Drawing Sheets

(56) References Cited

U.S. PATENT DOCUMENTS

| | | | |
|---|---|---|---|
| 2011/0307772 A1* | 12/2011 | Lloyd | G06F 17/2247 715/212 |
| 2012/0066353 A1 | 3/2012 | Schlusser | |
| 2012/0143690 A1 | 6/2012 | Hansen et al. | |
| 2012/0191840 A1 | 7/2012 | Gordon | |
| 2013/0007499 A1* | 1/2013 | Moy | G06F 3/1423 713/400 |
| 2013/0041790 A1 | 2/2013 | Murugesan et al. | |
| 2013/0046893 A1 | 2/2013 | Hauser | |
| 2013/0212396 A1 | 8/2013 | Tamma | |
| 2013/0325967 A1 | 12/2013 | Parks | |
| 2016/0179475 A1* | 6/2016 | Velummylum | G06F 8/65 717/106 |

\* cited by examiner

DISTRIBUTION OF APPLICATIONS WITH A SAVED STATE

CROSS-REFERENCE TO RELATED APPLICATIONS

This application is a continuation of and claims priority to U.S. application Ser. No. 13/332,574 titled "DISTRIBUTION OF APPLICATIONS WITH A SAVED STATE", filed Dec. 21, 2011, which issued as U.S. Pat. No. 9,274,780 on Mar. 1, 2016, which is incorporated herein by reference in its entirety.

BACKGROUND

Users execute applications on client devices for a variety of purposes and generate a variety of types of data during the execution of the application. For instance, a user may play a game on the client device and may set high scores, defeat levels of the game, and unlock new features of the game.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are various embodiments for transmitting an application with a saved state to another user. In one embodiment, a saved state service receives a plurality of state parameters that define the state of the application being executed. The saved state service serializes the state parameters to a unique character string using a data interchange standard and embeds the unique character string within a link. The saved state service serves up the link to a requesting process that, upon being invoked, installs the application on the invoking client and initializes the application into the saved state. In the following discussion, a general description of the system and its components is provided, followed by a discussion of the operation of the same.

Figure 1:
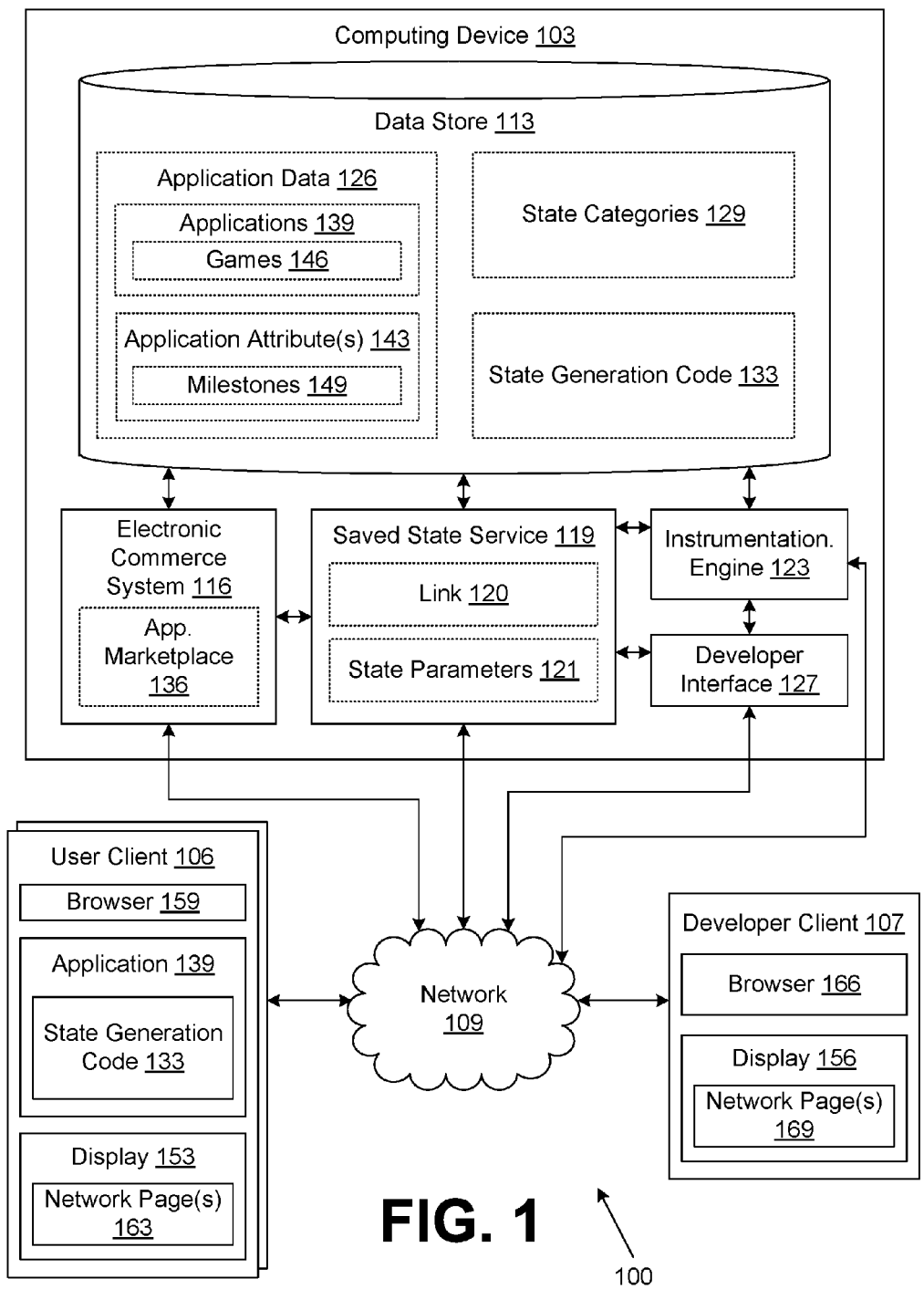
FIG. 1 is a drawing of a networked environment according to various embodiments of the present disclosure.

With reference to FIG. 1, shown is a networked environment 100 according to various embodiments. The networked environment 100 includes a computing device 103, a user client 106, a developer client 107, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include an electronic commerce system 116, a saved state service 119, an instrumentation engine 123, a developer interface 127, and other applications, services, processes, systems, engines, or functionality not discussed in detail herein. The electronic commerce system 116 is executed in order to facilitate the online purchase of items by customers over the network 109. The electronic commerce system 116 also performs various backend functions associated with the online presence of an application marketplace in order to facilitate the online purchase of applications as will be described. For example, the electronic commerce system 116 generates network pages, such as web pages or other types of network content that are provided to clients 106 for the purposes of selecting items for purchase, rental, download, lease, or other form of consumption as will be described.

In addition, the electronic commerce system 116 is executed in order to facilitate the online purchase of applications by customers from one or more application marketplaces 136 over the network 109. The application marketplace 136 embodies a network site that offers a multitude of applications for sale, download, purchase, and/or lease by the users. The applications are offered in the application marketplace 136 by multiple developers. In one embodiment, developers may self-register for accounts with the application marketplace 136 and self-manage various offerings of applications in the application marketplace 136 by way of the developer interface 127.

The saved state service 119 is configured to generate a link 120 that installs and initializes an application in a desired state. In one embodiment, the saved state service 119 is configured to collect state parameters 121 from one or more applications that are executed in the user clients 106. For instance, each of the state parameters 121 may correspond to a user progress and/or advancement with respect to an attribute of an application. In one embodiment, the state parameters 121 may describe anything relating to the state of the application. For instance, the state parameters 121 may describe an elapsed time since the application began executing in the user client 106, an amount of data generated by the execution of the application, and an indication of a location, user interface screen, or point that has been reached in the application. The state parameters 121 may include other data relating to system load, and/or other information relating to the application status or that quantifies a state of the application.

The instrumentation engine 123 is configured to process applications obtained from developers to identify locations in the application where state parameters 121 are to be collected and to modify the application to include code that generates and reports the state parameters 121 to the saved state service 119. The developer interface 127 is configured to obtain applications from developer clients 107 to be offered in an application marketplace. To this end, the developer interface 127 may be configured to process the applications by way of the instrumentation engine 123 before offering the application in an application marketplace. The developer interface 127 and/or the electronic commerce system 116 may include a commercially available hypertext transfer protocol (HTTP) server such as, for example, Apache® HTTP Server, Apache® Tomcat®, Microsoft® Internet Information Services (IIS), and so on.

The data stored in the data store 113 includes, for example, application data 126, state categories 129, state generation code 133, an application marketplace 136, and potentially other data. The application data 126 includes information describing the applications executed on the user client 106. For instance, the applications may be served up from the computing device 103, executed on the user client 106, and/or executed on any other computing system. The application data 126 may include a unique identifier for the application 139, a listing of the application attributes 143, and/or any other information related to the application 139. In one embodiment, the applications 139 may be served up by an application marketplace 136 that offers a multitude of applications 139 for sale, download, purchase, lease, etc., by users. Further, the applications 139 may be offered by multiple developers who may manage the various offerings of the applications 139 in the application marketplace 136 by way of the developer interface 122.

The applications 139 may be executed in the user client 106 and/or served up to the user on the user client 106. An application 139 may be, for example, a game and/or other types of applications. As non-limiting examples, an application 139 may comprise a game 146 such as, for instance, a first-person shooter game, an action game, an adventure game, a party game, a role-playing game, a simulation game, a strategy game, a vehicle simulation game, and/or other types of games. Further, the application 139 may comprise a word processor, office management application, enterprise resource planning applications, and/or any other type of application. The applications 139 may be designed for execution in a general-purpose computing device or in a specialized device such as, for example, a smartphone, a video game console, a handheld game device, an arcade game device, etc.

Additionally, the application data 126 also includes application attributes 143 that describe the application 139. In one embodiment, each one of the application attributes 143 may correspond to at least one of the state categories 129. Further, using the game example from above, the application attributes 143 for the game 146 may include a plurality of milestones 149, and/or other indications of progress and/or advancement within the application 139. In one embodiment, the milestones 149 may include a listing of various achievements that the user may reach by interacting with the game 146, such as, for instance, records, levels, and/or any other type of accomplishment. For example, the game 146 may be a first-person shooter where the milestones 149 for the game 146 may include overcoming a threshold number of enemy fighters, uncovering a threshold number of clues, unlocking a threshold number of weapons, rescuing a threshold number of hostages, and/or any other type of milestone.

The state categories 129 may include a listing of state categories 129 that are used by the saved state service 119 to characterize a state of the application 139. For instance, the state categories 129 may describe an amount of progress made in a particular instance of an application 139, an amount of data generated using the application 139, a nature of the data generated during the execution of the application 139, a plurality of settings used in executing the application 139, and/or other state categories. In one embodiment, the saved state service 119 may generate a state parameter 121 for each one of the state categories 129 by measuring a user's progress with respect to a corresponding application attribute 143, as will be described.

The state generation code 133 corresponds to code that may be embedded, injected, or inserted into the applications 139 to generate the state parameters 121 of the application 139. The state generation code 133 may also be configured to report the state parameters 121 to the saved state service 119 upon generation, or periodically while the application 139 is executed in the user client 106. In one embodiment, the state generation code 133 may include various parameters to configure whether applications 139 are modified to generate state parameters 121, how often state parameters 121 are generated, how often state parameters 121 are reported, and/or other aspects of state generation and collection. In one embodiment, the state generation code 133 may include predefined bytecode patterns, predefined source code patterns, predefined file offsets, or other data that identify locations within applications 139 where the state generation code 133 may be injected or inserted.

The user client 106 and the developer client 107 are each representative of a respective plurality of client devices that may be coupled to the network 109. The user client 106 and the developer client 107 may each comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, smart phones, electronic book readers, or other devices with like capability. The user client 106 may include a display 153, and the developer client 107 may include a display 156. The display 153, 156 may comprise, for example, one or more devices such as cathode ray tubes (CRTs), liquid crystal display (LCD) screens, gas plasma-based flat panel displays, LCD projectors, or other types of display devices, etc.

The user client 106 may be configured to execute various applications such as a browser 159, an application 139, and/or other applications. The browser 159 may be executed in the user client 106, for example, to access and render network pages 163, such as web pages, or other network content served up by the computing device 103 and/or other servers. The user client 106 may be configured to execute an application 139 obtained from the computing device 103, where the application 139 has been modified to include state generation code 133 for generating and reporting state parameters 121 to the saved state service 119. The user client 106 may be configured to execute applications beyond the browser 159 such as, for example, email applications, instant message applications, and/or other applications.

The developer client 107 may be configured to execute various applications such as a browser 166 and/or other applications. The browser 166 may be executed in a developer client 107, for example, to access and render network pages 169, such as web pages, or other network content served up by the computing device 103 and/or other servers. The developer client 107 may be configured to execute applications beyond the browser 166 such as, for example, mobile applications, software development and testing applications, email applications, instant message applications, and/or other applications.

Next, a general description of the operation of the various components of the networked environment 100 is provided. In one embodiment, a user on a user client 106 executes an application 139, such as a game 146, and advances through the application to reach a particular state. For example, the user may reach a milestone 149 within the game 146, and/or establish another application attribute 143 of the application 139. For instance, in reaching a particular state of the application 139, the user may have established application attributes 143 such as, for instance, settings for execution of the application 139, generated an amount of data generated by using various application attributes 143, and/or any other aspect of the application that corresponds to at least one of the application attributes 143. In one embodiment, the user may wish to share the state of the application 139 to which the user has advanced. To this end, the user may transmit a request to the saved state service 119 from the user client 106 to generate a link 120 that may be communicated to another user to share the state of the application 139. In one embodiment, the saved state service 119 generates the link 120 by receiving a plurality of state parameters 121 that is determined by the state generation code 133 inserted within the application 139, as will be described.

To begin, a developer at a developer client 107 creates an application 139. The developer transfers the application 139 to the computing device 103 by way of the developer interface 127. In one example, the developer may specify whether the application 139 is to be modified to enable collection of state parameters 121. For instance, some applications 139 may operate with private and/or confidential information that the developer may not want modified due to security concerns. In another example, the application 139 may be modified regardless of any developer input.

In some embodiments, the developer may specify, by way of an application programming interface (API), identifications of locations in the application 139 where state parameters 121 are to be generated. Additionally, the developer may specify what data is to be included in a state parameter 121. For instance, using the example from above, the application 139 may be a game 146. The developer may specify locations in the application 139 that include application attributes 143 corresponding to at least one of the state categories 129. In one embodiment, these application attributes 143 may include milestones 149, and/or any other indications of progress that are associated with the game 146, as discussed above.

If the application 139 is to be modified, the instrumentation engine 123 profiles the application 139 code. In one embodiment, the instrumentation engine 123 may identify one or more locations in the application 139 where the application 139 is to be modified. For instance, the instrumentation engine 123 may parse the application 139 code to search for stored signatures, bytecode profiles, source code profiles, predefined file offsets, etc. The instrumentation engine 123 may automatically insert or inject code into the application 139 that corresponds to portions of the state generation code 133 for the purpose of generating and reporting state parameters 121. In one embodiment, the developer may flag certain code in the application 139 or make certain library and/or function calls in order to indicate where the state generation code 129 is to be inserted.

In one embodiment, an application 139 may be modified such that a state parameter 121 is generated any time a user advances to reach a milestone 149, generates data using at least one of the application attributes 143, and/or modifies a plurality of settings that correspond to at least one of the application attributes 143. The state parameters 121 may include various data about the progress and/or advancement of the user in executing the application 139 on the user client 106. In particular, the state parameters 121 may correspond to session information regarding a current session of the application 139. In one embodiment, a session may correspond to an instance of the application 139 executed by the user on a particular user client 106.

The application 139 is configured to report the state parameters 121 back to the saved state service 119 that is executed in the computing device 103. The reporting may happen upon generation of a state parameter 121, after a batch of state parameters 121 is generated, periodically, relative to an event, or at another time. Additionally, the reporting may happen upon a request by the saved state service 119. For instance, after the saved state service 119 receives a request to the generate the link 120, the saved state service 119 may then request that the application 139 being executed on the user client 106 report the state parameters 121. In one embodiment, the state generation code 133 may be configured to delay reporting based on user client 106 system load, network load, and/or status.

The modified application 139 is stored in the data store 113 and offered in the application marketplace 136. Users may access the application marketplace 136 using a browser 159 or other application and place an order for the application 139 using the electronic commerce system 116. Upon consummating the order, the electronic commerce system 116 facilitates a transfer of the modified application 139 to the user client 106. In various embodiments, the modified application 139 may be transferred over the network 109. In other embodiments, the modified application 139 may be sent by mail or courier through a computer-readable medium.

Users install the modified application 139 on one or more user clients 106, which may or may not be the same user client 106 through which the application 139 was obtained. The users execute instances of the modified application 139 in the user clients 106. The instances of the modified application 139 are configured to generate and report the state parameters 121 through the state generation code 133 as described above. For instance, the modified application 139 may report state parameters 121 corresponding to the user advancement and/or progress in using the application 139. In one embodiment, the reported state parameters 121 may indicate the user advancement and/or progress in completing the milestones 149, achieving a task by using an application attribute 143, and/or performing any other indications of progress in the modified game 146. As an example, the milestone 149 identified by the developer for determining state parameters 121 may be a task for a game player in solving a mystery within a predetermined amount of time. The state generation code 133 in the modified game 146 may direct the modified game 146 to record user progress in accomplishing this milestone 149. For instance, the modified game 146 may record various points scored, an amount of money earned, a number of enemies subdued, another accomplishment in achieving this milestone 149, and/or any other parameter related to the milestone 149. The state parameters 121 may then be reported to the saved state service 119 in an encrypted format or by way of an encrypted channel over the network 109. Thus, the state parameters 121 describe a current state of the instance of the application 139 being executed on the user client 106.

The saved state service 119 may process the state parameters 121 periodically or in response to an event. For instance, the saved state service 119 may process the state parameters 121 upon receiving a request to generate a link 120, such as, for example, a hyperlink. The saved state service 119 generates the link 120 that may then be shared with other users to install the application 139, and then initialize the application 139 to a state specified by the link 120. In one embodiment, the state specified or described by the link 120 corresponds to the state parameters 121 reported by the application 139 during execution on the user client 106. For instance, the saved state service 119 serializes the state parameters 121 to generate a unique character string representing each component of the state parameters 121. As understood by one of ordinary skill in the art, serialization refers to a process of converting a data structure or object state into a format that can be stored or transmitted and then "resurrected" later in the same or another computer environment. As a non-limiting example, the saved state service 119 may invoke a data interchange standard such as, for instance, JavaScript Object Notation (JSON), binary JSON, geographic JSON (GeoJSON), simple object access protocol (SOAP), and/or any other standard for exchanging structured information, as can be appreciated. In one embodiment, the saved state service 119 may generate a look-up table that draws an association between the unique character string and the state parameters 121 reported by the application 139. The saved state service 119 then embeds the unique character string representing the serialized data into the link 120 and serve up the link 120 to the requesting user. For instance, the saved state service 119 may append the character string to a tail end of the characters comprising the link 120. In another embodiment, the link 120 describes the state by referring to a storage location in which the state parameters 121 are stored. The storage location may be, for example, the data store 130 or any storage location that is accessible via the network 109.

In one embodiment, the user then transmits the link 120 to one or more other users. For instance, the link 120 may be transmitted to the user via email, a network page 163, a text message, a quick response code, through a social network, and/or any other mode of communication. Upon invoking the link 120, the application 139 referenced by the link 120 is installed on a recipient user client 106. Additionally, application 139 may then automatically initialize to reach a state defined by the link 120. For instance, the application 139 may be configured to de-serialize the unique character string embedded in the link 120 to determine the state parameters 121 that comprise the specified state. In one embodiment, the application 139 may transmit a request to the saved state service 119 to de-serialize the unique character string, and in response, receive a listing of the state parameters 121 for the specified state. For instance, the saved state service 119 may de-serialize the unique character string according to the data interchange standard used to generate the serialized data. Having de-serialized the unique character string, the saved state service 119 may then transmit the corresponding state parameters 121 to the application 139 executing on the recipient user client 106. In another embodiment, the saved state service 119 may reference a look-up table to determine the state parameters 121 that correspond to the unique character string. The application 139 may then adopt the state parameters 121 to reach the state intended to be shared.

The saved state service 119 may make links 120 from different applications 139 available to other users through an electronic marketplace. The links 120 presented by the marketplace to a particular user may be limited by a base geographic location that is specified by the saved state service 119. Such embodiments may be desirable when the game or other application 139 has relevance to a real world location. For example, some of the saved state parameters 121 may relate to the city of San Jose, Calif., where this location is captured at the time the state is saved.

Some embodiments filter saved state links by a marketplace user's current geographic location. In such embodiments, the marketplace presents to the user only those links 120 which are associated with locations within a predetermined area around the marketplace user's current location (e.g., a ten mile radius). The user's current geographic location may be determined, for example, through mechanisms such as a Global Positioning System (GPS), an assisted global positioning system (A-GPS), a wireless local area network (WiFi) positioning system, or a wireless network (WiMax) positioning system, or other mechanisms. Using the above example of a link 120 associated with San Jose, marketplace users in San Jose would see the link 120 as being available, while marketplace users outside of San Jose would not see this link 120.

Other embodiments allow a marketplace user to filter saved state links by a chosen geographic location, rather than the current geographic location. This allows a user in one location (e.g., Boston) to view links 120 relevant to a different location (e.g., San Jose). In this manner, a user planning to travel to San Jose can discover, while in Boston, what links 120 are available in San Jose.

Several example scenarios will now be described. As one example, a user on the client 106 may be playing a game 146, such as, for example, an automobile simulation video game. In playing the game 146, the user may have raced an automobile through a threshold number of tracks and/or levels in the game 146 and unlocked a coveted prize, such as, for example, a rare automobile, a secret race track, a unique automobile body kit, and/or any other in-game feature of the game 146. As such, the current state of the game 146 may include the unlocked and coveted prize. To share this state with another, the user may transmit a request to the saved state service 119 to generate a link 120 that, upon invocation, installs the game 146 and initializes the state to include the coveted prize upon invocation. The user may then share the generated link 120, such as, for instance, through a social network, as can be appreciated.

As another example, a user on the client 106 may execute a photo editing application 139 to edit a photograph, such as, for example, a scenic mountain. In editing the photograph, the user may have modified a number of photograph features and added a variety of after effects to the photograph. As such, the current state of the application 139 may include the photograph with the modifications and additions indicated by the user. To share this state with another, the user may transmit a request to the saved state service 119 to generate a link 120 that, upon invocation, installs the photo editing application 139 and initializes the application 139 to include a "live" version of the photograph being edited. For instance, the recipient user may be able to "undo" modifications to the photograph, enhance effects added to the photograph, and/or otherwise edit the photograph.

As another example, a user on the client 106 may be executing a browser application 139 to browse a plurality of network pages 163, such as, for instance, network pages 163 served up by an electronic commerce system 116. In browsing the network pages 163, the user may have accumulated a robust browsing history, and may have a plurality of windows open in the browser 159. As such, the current state of the browser application 139 may include the browsing history and the windows. To share this state with another, the user may transmit a request to the saved state service 119 to generate a link 120 that, upon invocation, installs the browser application 139 and initializes the browser application 139 to adopt the browsing history and the windows. The recipient user may then be able to browse through the network pages 163 shared by sender, such as, for instance, manipulating a "back" navigation button to navigate the browsing history established by the sender.

In one embodiment, the saved state service 119 may generate a unique link 120 upon every request. For instance, the data interchange standard may indicate a new and unique character string for even a negligible change in the state parameters 121. In addition, the saved state service 119 may include a variety of security features to protect the integrity of the data referenced by the link 120. In one embodiment, the link 120 may be valid for a predetermined amount of time, for a predetermined number of invocations, for a predetermined geographic location, and/or any other security feature. In another embodiment, the link 120 may be shared through secured modes of communication to ensure that the link 120 is shared to the intended users.

In some embodiments, installation of application 139 through a saved state link 120 has no effect on the state of the user responsible for generating the link. In such embodiments, the transfer of state has no effect on the state of the user who is the source of the saved state link 120. In other embodiments, the source user's state is affected when another user installs the application 139 through the saved state link 120. In some of these embodiments, uninstall through the saved stated link 120 results in the source user losing some or all of the state captured in the state parameters 121, so that the source user is returned to an initial state. For example, a user playing a game application 139 may return to game level zero. The loss of state may be temporary or permanent. For embodiments involving a temporary loss, the source user is returned to an initial state when the application 139 is installed by another user through the saved state link 120. At the end of a predetermined period, the source user is returned to the state before the transfer. Thus, in some embodiments the transfer of state may be viewed as a temporary loan of state, while in others the transfer may be permanent.

Figure 2:
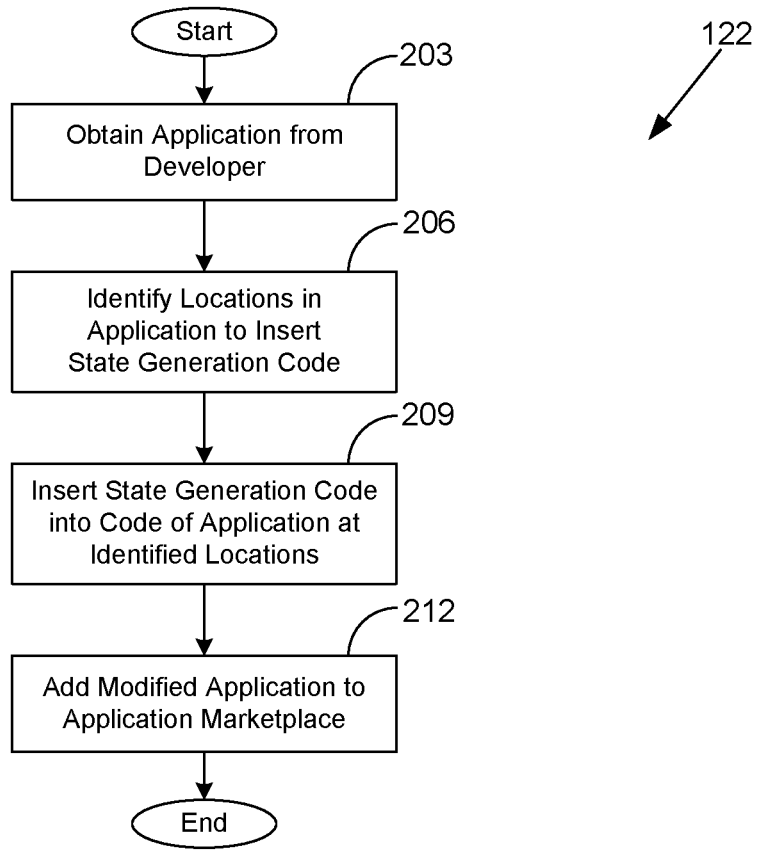
FIG. 2 is a flowchart illustrating one example of functionality implemented as portions of a developer interface executed in a computing device in the networked environment of FIG. 1 according to various embodiments of the present disclosure.

Referring next to FIG. 2, shown is a flowchart that provides one example of the operation of a portion of the developer interface 127 according to various embodiments. Specifically, FIG. 2 illustrates the addition of applications 139 (FIG. 1) to an application marketplace. It is understood that the flowchart of FIG. 2 provides merely an example of the many different types of functional arrangements that may be employed to implement the operation of the portion of the developer interface 127 as described herein. As an alternative, the flowchart of FIG. 2 may be viewed as depicting an example of steps of a method implemented in the computing device 103 (FIG. 1) according to one or more embodiments.

Beginning with box 203, the developer interface 127 obtains the application 139 from the developer at the developer client 107 (FIG. 1). In one embodiment, the developer interface 127 generates network page 169 (FIG. 1) which includes upload functionality for the developer to upload the application 139. In another embodiment, the developer interface 122 obtains a specification of a uniform resource locator (URL) from the developer corresponding to the application 139, and the developer interface 127 may be configured to download the application 139 from that location. In still other embodiments, the application 139 may be loaded into the data store 113 (FIG. 1) through other approaches (e.g., compact disc, flash drive, file transfer protocol (FTP), email, etc.). The application 139 may correspond to a binary file containing bytecode or object code. Alternatively, the application 139 may correspond to a script file or source code.

In box 206, the developer interface 122 launches the instrumentation engine 123 (FIG. 1) to identify locations in the application 139 where state generation code 133 (FIG. 1) is to be inserted. To this end, the instrumentation engine 123 may engage in static profiling based at least in part on predefined code patterns or signatures to identify locations in the application corresponding to user interface screens, game levels, user interface components, or other points in the application 139. In one embodiment, the instrumentation engine 123 may also be configured to perform runtime profiling on the application 139 to identify such locations.

In box 209, the instrumentation engine 123 inserts the state generation code 133 into the code of the application 139 at the identified locations. It is noted that the state generation code 133 may be specially configured depending on the type of state parameters 121 that is desired to be calculated and the location where it is inserted. Additionally, the instrumentation engine 123 modifies the application 139 to include state generation code 133 that reports the state parameters 121 that are generated.

In box 212, the developer interface 127 adds the modified version of the application 139 to the application marketplace. The application 139 may be made available for purchase and/or download in response to customer orders via the electronic commerce system 116 (FIG. 1). Thereafter, the portion of the developer interface 122 ends.

Figure 3:
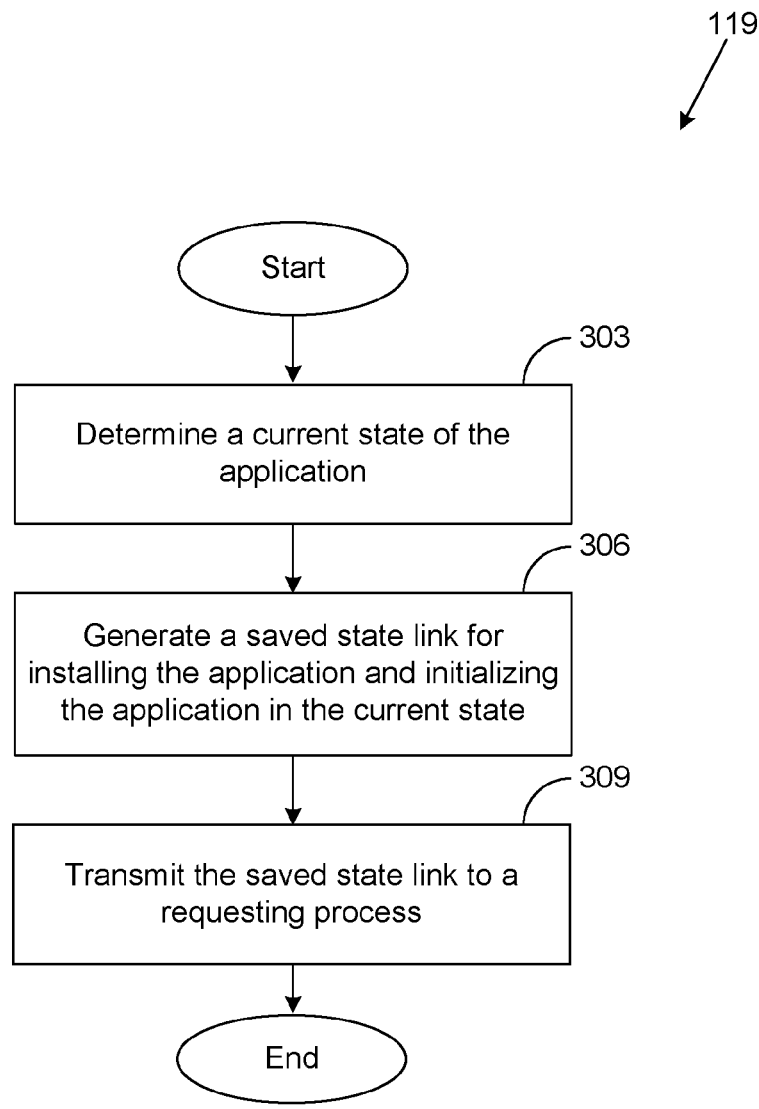
FIG. 3 is a flowchart illustrating one example of functionality implemented as portions of a saved state service executed in a computing device in the networked environment of FIG. 1 according to various embodiments of the present disclosure.

Turning now to FIG. 3, shown is a flowchart that provides one example of the operation of a portion of the saved state service 119 according to various embodiments. It is understood that the flowchart of FIG. 3 provides merely an example of the many different types of functional arrangements that may be employed to implement the operation of the portion of the saved state service 119 as described herein. As an alternative, the flowchart of FIG. 3 may be viewed as depicting an example of steps of a method implemented in the computing device 103 (FIG. 1) according to one or more embodiments.

Beginning with box 303, the saved state service 119 determines a current state of the application 139 (FIG. 1) being executed on the user client 106 (FIG. 1). In one embodiment, the saved state service 119 determines the state from the state parameters 121 reported to the saved state service 119 during execution of the application 139. For instance, the application 139 may be a control system for monitoring an alarm system of a household. In one embodiment, the user may have established a plurality of settings for the control system to effectively protect the household, such as, for instance, timings for initiating the alarm system, emergency numbers, security codes and pass phrases, and/or any other setting of the control system. As such, the state of the application 139 includes the established settings of the application 139. In one embodiment, the state generation code 133 (FIG. 1) inserted in the code of the application 139 reports the state parameters 121 defining the state of the application 139 to the saved state service 119.

Then, in box 306, the saved state service 119 generates a saved stated link 120 that, upon invocation, installs and initializes the application 139 in the current state. In one embodiment, the saved state service 119 serializes the state parameters 121 to generate a unique character string according to a data interchange standard. The saved state service 119 then generates the saved state link 120 by embedding the unique character string into the saved state link 120. For instance, the unique character string may be amended onto a tail end of the saved state link 120.

In box 309, the saved state service 119 transmits the saved state link 120 to the requesting process, such as, for example, a client side application implemented on the user client 106 (FIG. 1). In one embodiment, the saved state link 120 may be transmitted via an email message, and/or another mode of communication. The recipient user may then invoke the saved state link 120 to install the application 139 and initialize the application 139 in the state indicated by the state parameters 121. Using the above example of the control system to monitor the alarm system, a customer may invoke the saved state link 120 to install the control system on the recipient user client and initialize the application 139 to adopt the previously established application settings.

Figure 4:
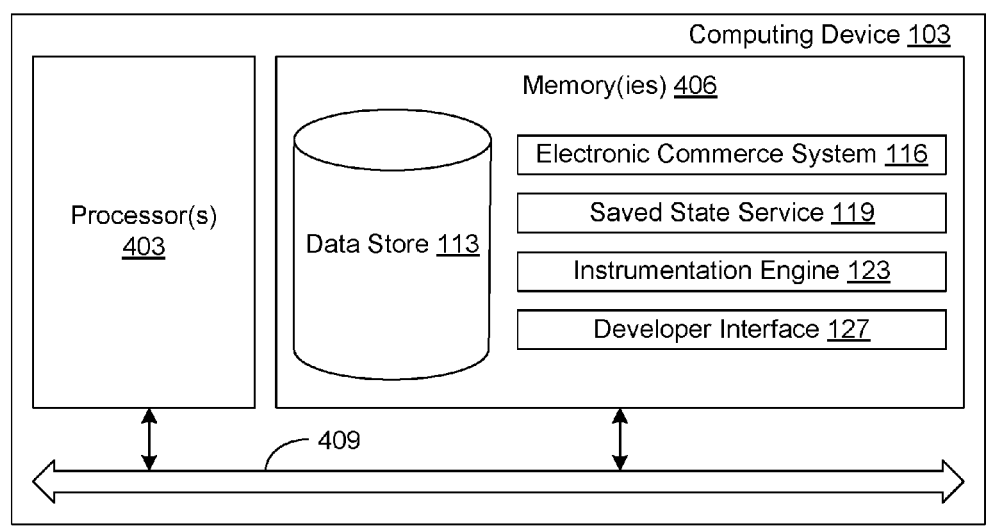
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 116, the saved state service 119, the instrumentation engine 123, the developer interface 127, and potentially other applications. Also stored in the memory 406 may be a data store 113 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 116, the saved state service 119, the instrumentation engine 123, the developer interface 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the developer interface 127 and the saved state service 119, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 116, the saved state service 119, the instrumentation engine 123 and the developer interface 127, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed, causing the computing device to at least:
   insert state generation code into code of an application available in an application marketplace, the state generation code configured to generate a plurality of parameters defining a state of the application during execution on a first client;
   receive the plurality of parameters from the first client; and
   generate a saved state link for installing the application and initializing the application in the state, wherein the plurality of parameters defining the state are associated with the saved state link.

2. The non-transitory computer-readable medium of claim 1, wherein the state generation code corresponds to at least one state generation parameter defining at least one of: how often the plurality of parameters are generated or how often the state parameters are communicated to the computing device.

3. The non-transitory computer-readable medium of claim 1, wherein the state generation code is inserted based at least in part on at least one of a bytecode pattern, a source code pattern or a file offset.

4. A system, comprising:
   at least one computing device comprising at least one processor and at least one memory, the at least one computing device configured to at least:
   insert state generation code into code of an application available in an application marketplace, the state generation code configured to generate a plurality of parameters defining a state of the application during execution on a first client;
   receive the plurality of parameters from the first client; and
   generate a saved state link for installing the application and initializing the application in the state, wherein the plurality of parameters defining the state are associated with the saved state link.

5. The system of claim 4, wherein the at least one computing device is further configured to at least transmit the saved state link to a requesting process.

6. The system of claim 5, wherein the requesting process is a client side application implemented on a second client in data communication with the at least one computing device.

7. The system of claim 4, wherein the plurality of parameters defining the state are embedded in the saved state link.

8. The system of claim 4, wherein the at least one computing device is further configured to at least:
   serialize the plurality of parameters; and
   wherein the saved state link comprises the serialized plurality of parameters.

9. The system of claim 4, wherein the state generation code is configured to delay a communication of the plurality of parameters to the at least one computing device.

10. The system of claim 9, wherein the communication is delayed based at least in part on at least one of a system load or a network load.

11. The system of claim 4, wherein invoking the saved state link on a second client installs the application on the second client and initializes the application according to the state.

12. The system of claim 4, wherein the state generation code corresponds to at least one state generation parameter defining at least one of: how often the plurality of parameters are generated or how often the state parameters are communicated to the at least one computing device.

13. The system of claim 4, wherein the state generation code is inserted based at least in part on at least one of a bytecode pattern, a source code pattern or a file offset.

14. A method, comprising:
   inserting, by at least one computing device, state generation code into code of an application available in an application marketplace, the state generation code configured to generate a plurality of parameters defining a state of the application during execution on a first client;
   receiving, by the at least one computing device, the plurality of parameters from the first client; and
   generating, by the at least one computing device, a saved state link for installing the application and initializing the application in the state, wherein the plurality of parameters defining the state are associated with the saved state link.

15. The method of claim 14, further comprising:
   serializing, by the at least one computing device, the plurality of parameters; and
   wherein the saved state link comprises the serialized plurality of parameters.

16. The method of claim 14, wherein invoking the state generation code is configured to periodically communicate the plurality of parameters to the at least one computing device.

17. The method of claim 14, further comprising identifying a location in the application to insert the state generation code.

18. The method of claim 17, wherein the location is identified based at least in part on at least one of a bytecode pattern, a source code pattern, or a file offset.

19. The method of claim 14, wherein the state generation code is configured to delay a communication of the plurality of parameters to the at least one computing device.

20. The method of claim 19, wherein the communication is delayed based at least in part on at least one of a system load or a network load.

* * * * *